No. 664,015. Patented Dec. 18, 1900.
A. DENAEYER.
EVAPORATING APPARATUS.
(Application filed May 26, 1900.)
(No Model.)
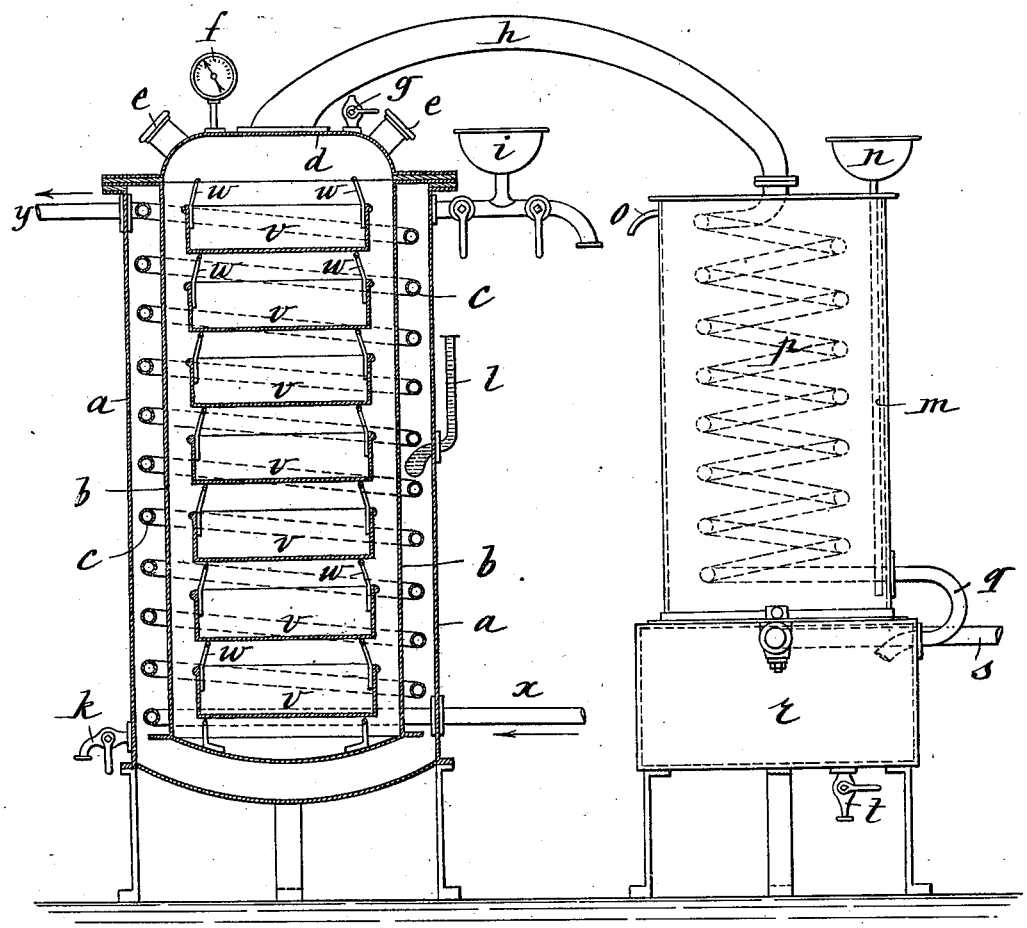
WITNESSES:
INVENTOR
Alphonse Denaeyer
BY
ATTORNEYS

UNITED STATES PATENT OFFICE.

ALPHONSE DENAEYER, OF BRUSSELS, BELGIUM.

EVAPORATING APPARATUS.

SPECIFICATION forming part of Letters Patent No. 664,015, dated December 18, 1900.

Original application filed August 8, 1899, Serial No. 726,571. Divided and this application filed May 26, 1900. Serial No. 18,161. (No model.)

*To all whom it may concern:*

Be it known that I, ALPHONSE DENAEYER, a subject of the King of Belgium, and a resident of Brussels, Belgium, have invented certain new and useful Improvements in Apparatus for Manufacturing Cocoa, Chocolate, and other Alimentary Substances, of which the following is a specification, this application being a division of the application filed by me in the United States Patent Office August 8, 1899, Serial No. 726,571.

The object of the invention is to provide an apparatus in which cocoa, chocolate, and other alimentary substances may be evaporated in such a manner as to produce a light spongy or flocculent mass, containing suitable proportions of cocoa or chocolate and milk, which will readily dissolve under the action of hot water without the necessity of boiling.

The invention is illustrated in the accompanying drawing, in which the figure represents a sectional elevation of the evaporating apparatus.

This apparatus consists of a casing $a$, within which is suspended a closed vacuum vessel $b$ of cylindrical shape and of smaller diameter, and in the space between this vessel and the casing is arranged a coiled pipe $c$, through which steam or other heating fluid may be circulated to maintain the vessel $b$ at the required temperature. The annular space between the vessel $b$ and the casing is also designed to be filled with water or other suitable liquid, so as to constitute a water-bath for the vessel $b$, being provided for this purpose with a charging-funnel $i$ and a draw-off cock $k$. A thermometer $l$ is also provided for ascertaining the temperature of said space.

The closed top $d$ of the vessel $b$ is provided with glass-covered sight-openings $e\ e$ and also with a vacuum-gage $f$. It is also provided with an admission-cock $g$ and a branch pipe $h$, connecting the vessel with a condenser $m$.

The top $d$ is provided with a flange, which serves to close the annular space surrounding the vessel, suitable packing being provided to make a tight joint.

Within the vessel $b$ are placed a series of pans $v$, arranged one above the other, adapted to contain the mixture of cocoa, milk, and sugar, which has preferably been previously partly condensed. These pans are provided with upwardly-projecting handles $w\ w$ of such a form as also to constitute supports for the pans above, while leaving the pan below entirely open, and it will thus be seen that any desired number of pans may thus be placed in the vessel and subjected simultaneously to heat and exhaust.

The condenser $m$, before referred to, is designed to be charged with cold water through an inlet or funnel $n$, having a pipe leading down to the bottom of the casing, while an exit-pipe $o$ is provided at the top.

Within the condenser vessel is a coil of pipe $p$, forming a continuation of the pipe $h$, and at the lower end this pipe connects by a bend $q$ with a tank $r$ for receiving the water of condensation produced in the coil. This tank is designed to be connected by a pipe $s$ with a suitable exhaust-pump (not shown) and is provided with a suitable discharge-cock $t$.

Having thus described my invention, what I claim is—

1. In combination, an evaporating vessel having a jacket, a heating-coil surrounding the same and a plurality of pans located within the vessel and clear of the walls thereof, each of said pans having opposite upwardly-extending handles designed to support the pan above, substantially as described.

2. In combination, the evaporating-chamber, the jacket surrounding the same, a heating-coil within said jacket, means for introducing a liquid within the jacket, a plurality of removable pans within the evaporating-chamber, and a pipe leading from the upper end of the evaporating-chamber through a condenser and connecting with a vacuum-chamber, substantially as described.

3. In combination, an inner evaporating-chamber, a plurality of pans therein, a delivery-pipe from the top thereof adapted for connection with a device for maintaining a vacuum therein, a vacuum-gage on said chamber, a jacket surrounding said chamber, a heating-coil therein, means for introducing a liquid within said jacket and a thermometer having its bulb located within the jacket, substantially as described.

In witness whereof I have hereunto set my hand in presence of two witnesses.

ALPHONSE DENAEYER.

Witnesses:
 UBERT TRAIPOUL,
 GREGORY PHELAN.